UNITED STATES PATENT OFFICE.

LEONARD RODENHAUSEN, OF PHILADELPHIA, PENNSYLVANIA.

MATERIAL FOR CLOSING PERFORATIONS AND FRACTURES IN CIGARS.

1,008,730.  Specification of Letters Patent.  Patented Nov. 14, 1911.

No Drawing.  Application filed May 5, 1911. Serial No. 625,332.

*To all whom it may concern:*

Be it known that I, LEONARD RODENHAUSEN, a citizen of the United States, residing in the city and county of Philadelphia, State of Pennsylvania, have invented a new and useful Material for Closing Perforations and Fractures in Cigars, of which the following is a specification.

My invention consists of a composition of matter adapted to close or cover perforations and fractures in cigars so as to preserve the comparatively-intact condition of the same and render them in fit condition for smoking, regardless of such perforations and fractures.

In carrying out my invention, I take proper quantities of tobacco as a base, sugar for its adhesive quality and water to steep the tobacco and dissolve the sugar, and boil them together forming a solution of the tobacco and the combination therewith of the sugar as dissolved producing a liquid to which may be added a sufficient quantity of alcohol. The tobacco may be in powdered or granulated form, but to this I do not limit myself.

When a cigar or cigarette is to be patched at a perforation or fracture therein, some of the liquid sufficient to cover said perforation or fracture is placed over the same as a closure thus overcoming the break in the draft of the cigar, and thus as the liquid is quick-drying the cigar may be smoked as in its original perfect or intact condition.

It will be seen that the sugar owing to its nature causes the liquid to be an adhesive, so that said liquid will readily stick to the cigar at the appointed place, while it does not materially change the flavor of the cigar at the perforation or fracture owing to the tobacco therein, the flavor of sugar being scarcely noticeable while the sugar will be readily consumed with the tobacco, and so the proper burning of the cigar will not be retarded, it being noticed further that when the liquid is applied to the cigar, owing to the rapid evaporation of the moisture of the liquid due to the alcohol, it is converted into a dry pliable patch and this may be smoked with the contiguous portion of the cigar without liability to crack or peel off.

Any suitable flavoring material may be added to the composition for evident purposes.

Having thus described my invention what I claim as new and desire to secure by Letters Patent is:—

1. A liquid preparation for closing perforations and fractures in cigars, composed of a solution of tobacco as a base and a quick-drying adhesive substance combined therewith and applicable to the exterior of a cigar wrapper.

2. A liquid preparation of matter for a cigar wrapper patch composed of tobacco, sugar, water and an evaporating fluid such as alcohol all commingled and constituting an adhesive substance for closing the fractures and perforations in the wrapper.

LEONARD RODENHAUSEN.

Witnesses:
 JOHN A. WIEDERSHEIM,
 N. BUSSINGER.

Copies of this patent may be obtained for five cents each, by addressing the "Commissioner of Patents, Washington, D. C."